W. TURNBULL AND E. F. NORELIUS.
ANTI-AIRCRAFT GUN MOUNT.
APPLICATION FILED SEPT. 1, 1917.

1,395,020.

Patented Oct. 25, 1921.
6 SHEETS—SHEET 3.

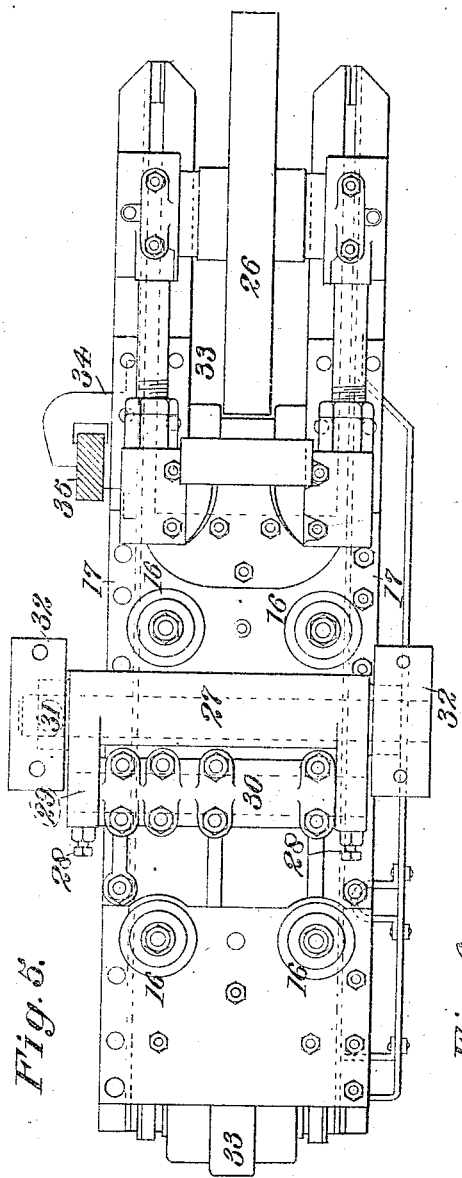

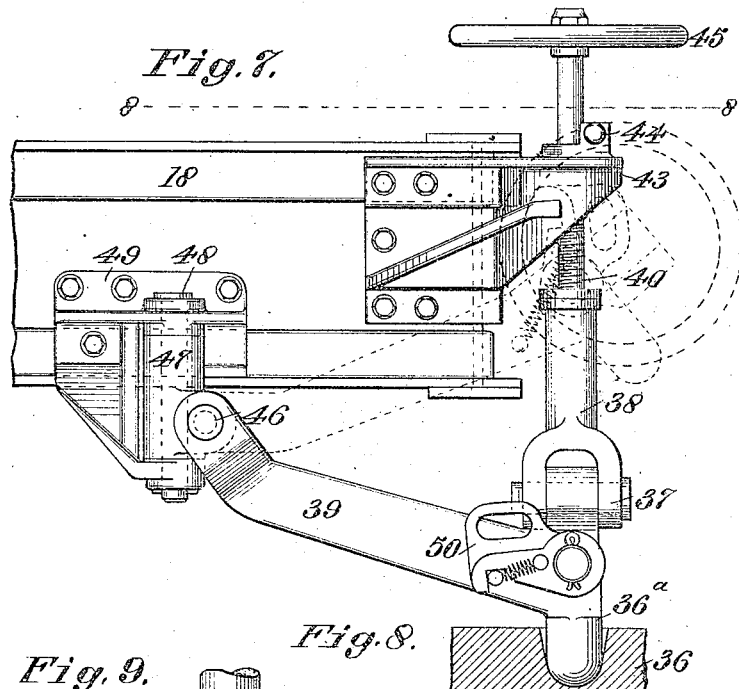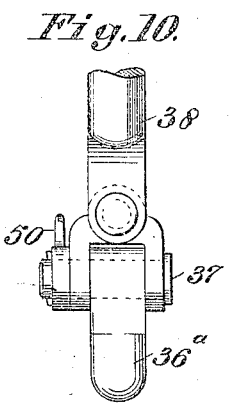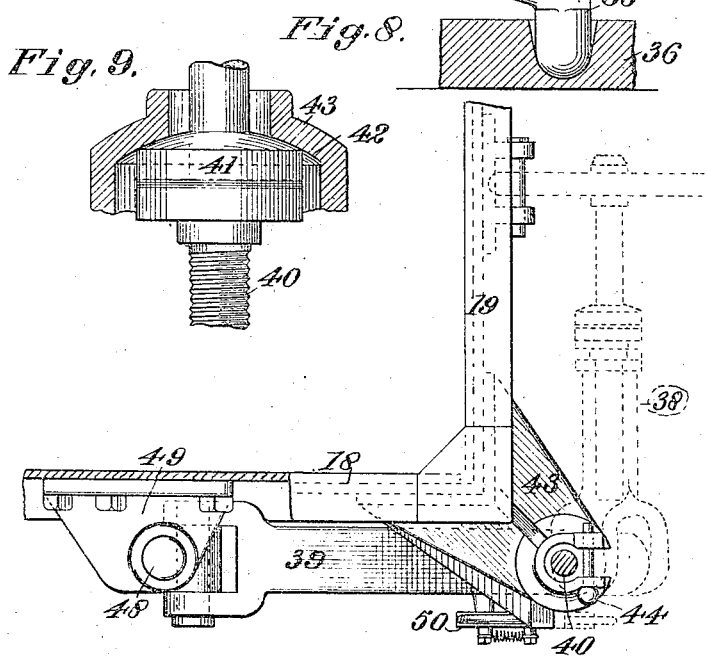

W. TURNBULL AND E. F. NORELIUS.
ANTI-AIRCRAFT GUN MOUNT.
APPLICATION FILED SEPT. 1, 1917.

1,395,020.

Patented Oct. 25, 1921.
6 SHEETS—SHEET 6.

WITNESSES:
Charles Nokles
J. H. Herring

INVENTORS
Emil F. Norelius
William Turnbull
BY Strong & Townsend
ATTORNEYS

UNITED STATES PATENT OFFICE.

WILLIAM TURNBULL AND EMIL F. NORELIUS, OF PEORIA, ILLINOIS, ASSIGNORS TO THE HOLT MANUFACTURING COMPANY, OF STOCKTON, CALIFORNIA, A CORPORATION OF CALIFORNIA.

ANTI-AIRCRAFT-GUN MOUNT.

1,395,020. Specification of Letters Patent. Patented Oct. 25, 1921.

Application filed September 1, 1917. Serial No. 189,371.

*To all whom it may concern:*

Be it known that we, WILLIAM TURNBULL and EMIL F. NORELIUS, citizens of the United States, residing at Peoria, in the county of Peoria and State of Illinois, have invented new and useful Improvements in Anti-Aircraft-Gun Mounts, of which the following is a specification.

This invention relates to gun mounts, and has for its object to provide a mobile self-propelled mounting especially suited for an anti-air craft gun, and so arranged as to permit the gun to be fired from a slightly depressed angle to almost a 90° elevation and also in a full 360° traverse.

In carrying out this object, we employ a carriage of the endless, flexible, self-laying track type of an improved and simplified character, a novel and advantageous construction of the main frame to receive a turret gun mount for movement throughout a full 360° traverse and having angular adjustment varying from a slightly depressed angle to almost a 90° elevation, with suitable power and transmission mechanism for the self-laying tracks so arranged as not to interfere with the proper positioning of the gun, and outrigger supports for the main frame which can be readily adjusted to the ground for stabilizing the mounting once the gun is set in proper position, such outriggers being foldable so as not to interfere with the ordinary travel of the machine. Other distinguishing features worthy of special consideration are the design of the outriggers which renders them sufficiently flexible to take care of any shifting of the machine during fire, means whereby the driving and supporting units are divided, the driving member being hung on the main frame and the supporting trucks being in two separate parts flexibly connected to the main frame, and the means whereby the roller trucks are held in a vertical position and in parallelism with the main frame.

One form which our invention may assume is exemplified in the following description and illustrated in the accompanying drawing, in which—

Fig. 5 shows a plan view of one of the front roller truck members of the carriage mechanism.

Fig. 6 shows a side elevation of the same.

Fig. 7 shows a side elevation of one of the corner outriggers in extended position.

Fig. 8 shows a plan view of the same.

Fig. 9 shows a detail, sectional view of the universal connection between the jack screw and the bracket member on the main frame.

Fig. 10 shows a detail view of the universal connection between the jack screw and the ground member of the outrigger.

Figure 3:
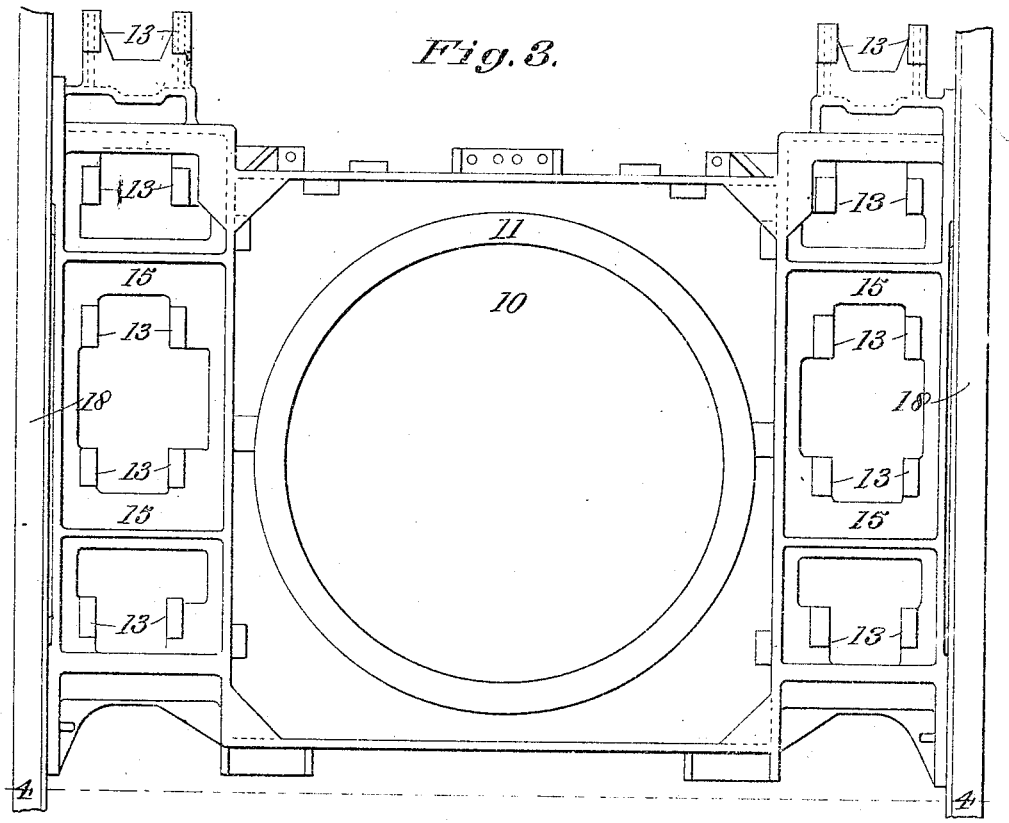
Fig. 3 shows a plan view of the casting constituting the central portion of the main frame.
Figure 4:
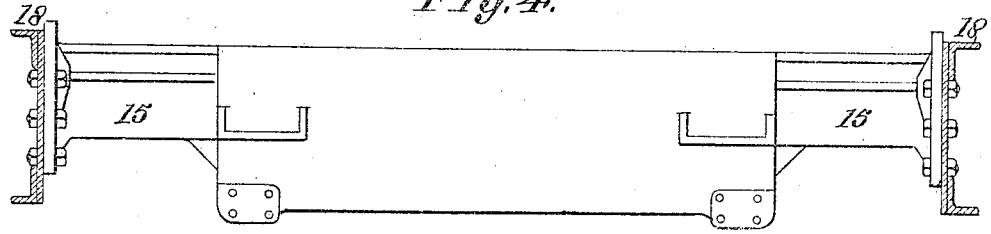
Fig. 4 shows an end elevation of the same, taken on the line 4—4 of Fig. 3.

Referring now in detail to the particular form of our invention illustrated in the accompanying drawings, the machine is built around the center casting 10, shown in Figs. 3 and 4. This casting extends entirely across the machine and has a ring-shaped surface 11 at its center forming a place to receive a turret gun 12. At each side the casting is formed with bearings 13 for rollers which support and guide the upper run of an endless, flexible, self-laying track 14 and supports 15 for springs 16 which seat upon rocking truck frame 17.

At each side of the center casting a rail member 18 is bolted and forms the side rail of the main frame, the ends of said rails being connected across by front and rear end pieces 19. Between the rear end piece and the center casting is connected a frame member 20, spaced from the side rails and forming a support for a motor 21 and a transmission mechanism 22. The front end of the center casting and the front end piece 19 of the main frame are also connected by frame pieces 23 which form supports for ammunition receptacles 24, etc.

The tracks 14 encircle the sides of the center casting and run between the side rails 18 and front and rear frame members 20 and 23. These tracks, one at each side, run over a rear driving sprocket wheel 25 journaled between the side rail and frame member 20 and at the front over a blank guide wheel 26 journaled upon the front end of the front truck member 17. The truck members at each side are divided into separate front and rear sections each flexibly connected to the main frame by means of a U-shaped crank member 27 having its arms secured by set screws 28 to a shaft 29 journaled in a bearing 30 on the truck frame.

The opposite end of the crank member is bored to receive turnably a pin 31 fixed at its ends in bearings 32 on the adjacent side rail and center casting, as shown in Figs. 5 and 6. The springs 16 for supporting the main frame upon the truck members are arranged at opposite sides of the flexible connection and thus each truck member is allowed to move vertically about the pin 31 and oscillate in a vertical plane about the shaft 29. Each truck member carries a series of flanged rollers 33 which operate upon the bottom run of the track in a manner well-known. On the inner side of each truck frame is a hook-shaped member 34 slidably receiving a guide bar 35 fastened to the main frame, whereby the truck frame members are held in parallelism with the main frame.

It will be noted from the foregoing that the driving sprocket wheels which propel the machine are carried on the main frame while the truck frames, which are of a sectional type, are flexibly connected to the main frame. Various forms of driving mechanisms for the track may be employed and we have merely indicated diagrammatically the position of the transmission mechanism which is at the rear of the main frame adjacent to the motor and operatively connected with the rear sprocket driving wheels, being preferably of the change speed type and embodying two steering clutches which are separately controlled to effect a steering of the tracks. This type of transmission is well-known in the art of tractors of the self-laying track type.

Figure 1:
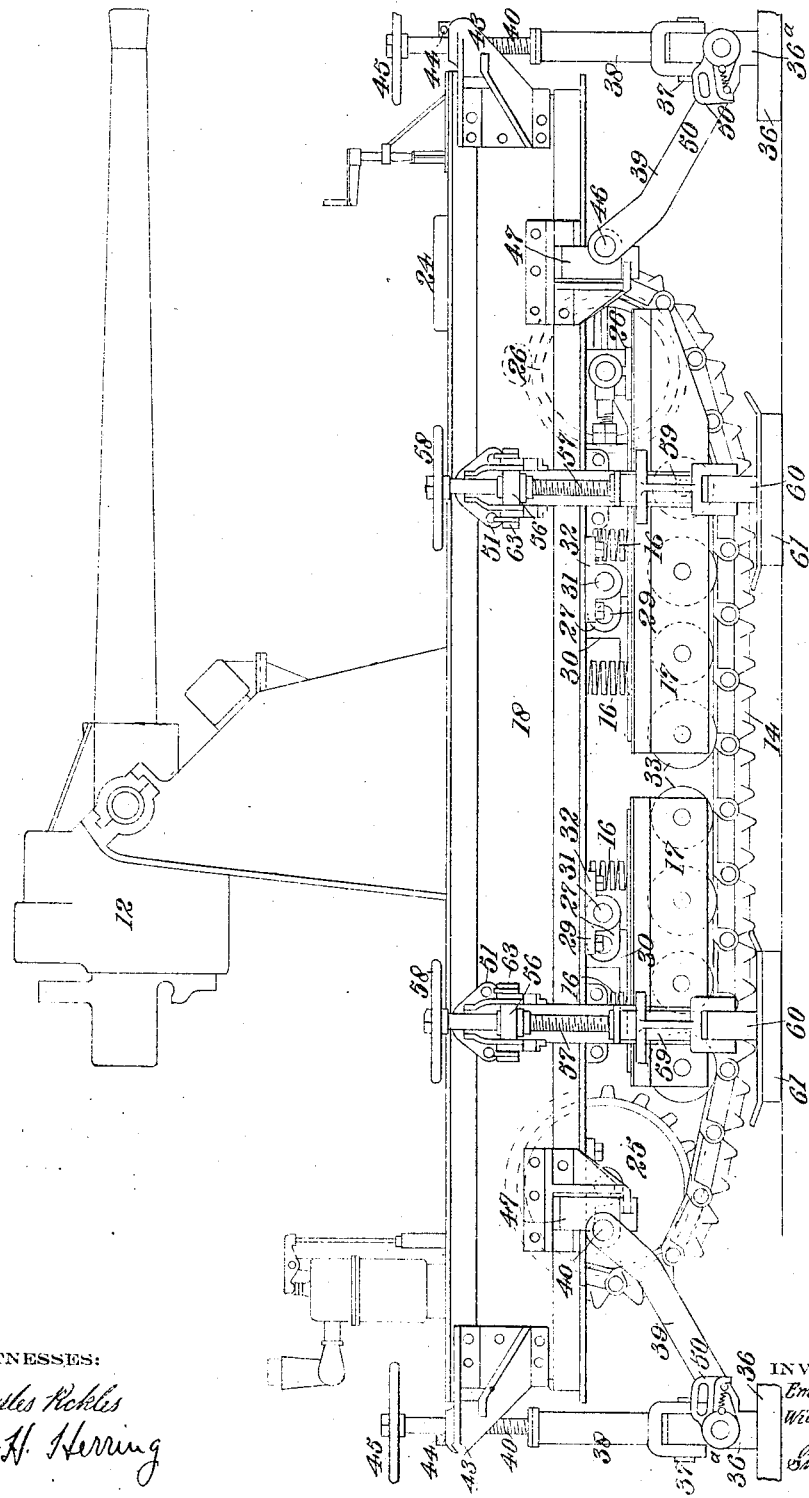
Figure 1 shows a side elevation of a machine embodying our invention, with the outrigger supports resting upon the ground and supporting the entire weight of the machine.
Figure 2:
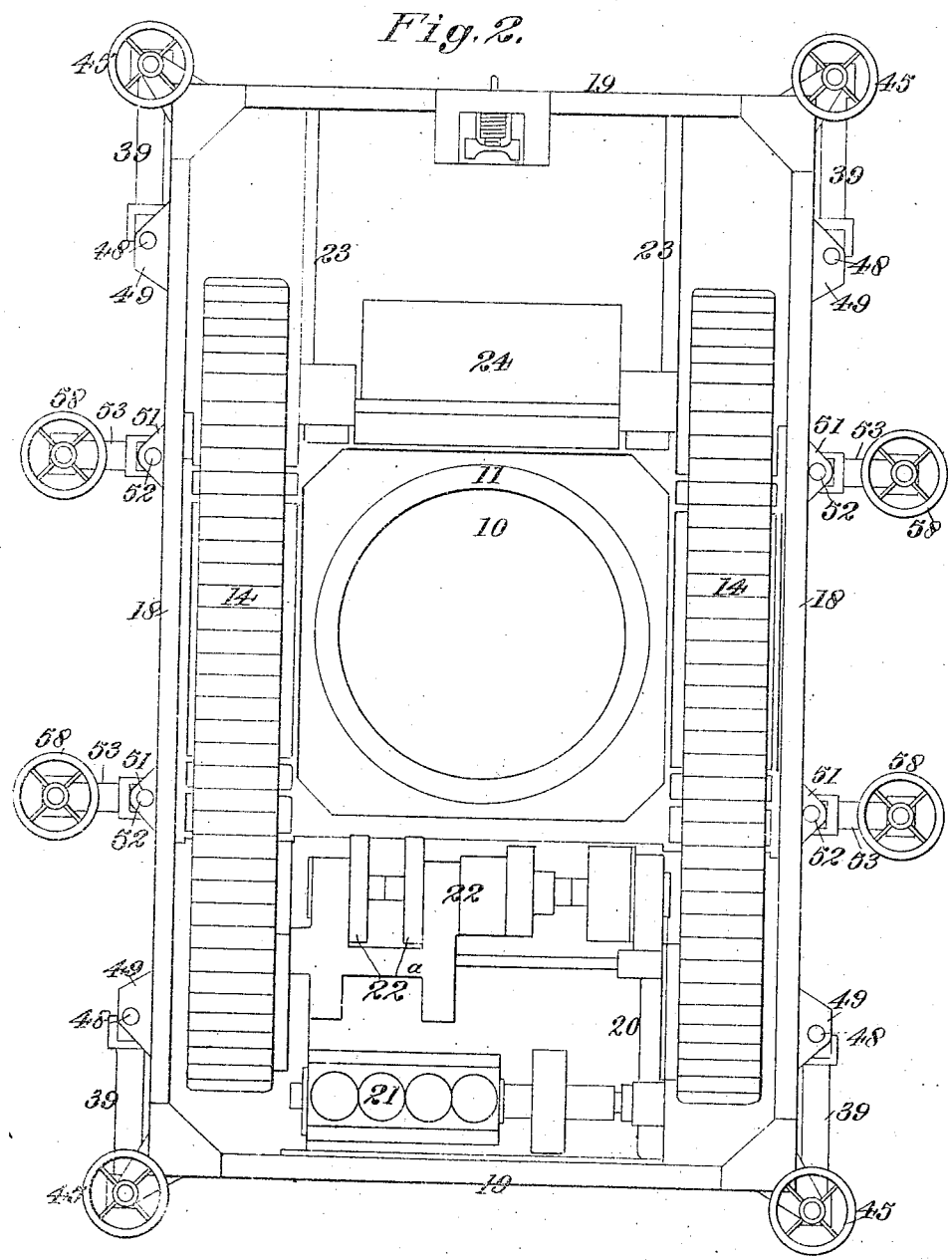
Fig. 2 shows a plan view of the same.

This machine being made to carry a high-powered gun, it is necessary to work out some scheme of support which can be quite readily adjusted to the ground to stabilize the main frame while the gun is being fired and which can also be folded in such a way as not to interfere with the ordinary travel of the machine. For this purpose we employ outriggers, as shown in Fig. 2, there being on this lay-out eight such outriggers all told. This number, of course, is not fixed and can be changed to any suitable number which will take care of the recoil of the gun in any direction that it may be fired. The design of the outriggers can be seen in detail in Fig. 7 et seq. of the drawings.

Fig. 7 shows the corner outrigger, the full lines showing it in position for supporting the machine while firing and the dotted lines showing it in folded position for road travel. The construction includes a shoe or grouser 36, carried ball and socket fashion upon a shank 36ª, which in turn has a universal joint connection 37 with a jack 38 extending vertically and an integral brace arm 39 extending diagonally. The jack receives a screw 40 which has a convex collar 41 fitted for universal movement in a socket 42 formed on a split bracket 43 secured to the corner of the main frame. A bolt or screw 44 passing through the split ends of the bracket holds the screw shaft in place, and said shaft is turnable by means of a hand-wheel 45. The diagonal brace bar 39 is connected at its upper end by a horizontal pivot 46 to a sleeve 47 turnable on a vertical pin 48, the latter being fixed in a bracket 49 at one side of the main frame.

It will be seen from this that the universal connections at opposite ends of the arm 39 and the shaft 36ª, leave the latter free to shift in case the machine should be thrust to one side during cross fire. The folding of the outrigger is accomplished by removing the bolt 44 and withdrawing the screw shaft from its bearing in the bracket 43 and turning it angularly, as shown in dotted lines in Fig. 8. The device is then preferably suspended in elevated position, as shown in dotted lines in Fig. 7 by means of a hook 50.

Figure 13:
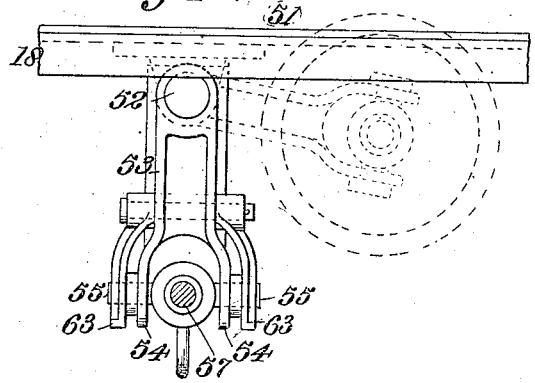
Fig. 13 shows a plan view of the same, the dotted lines in each instance indicating the position of the outrigger when folded.
Figure 11:
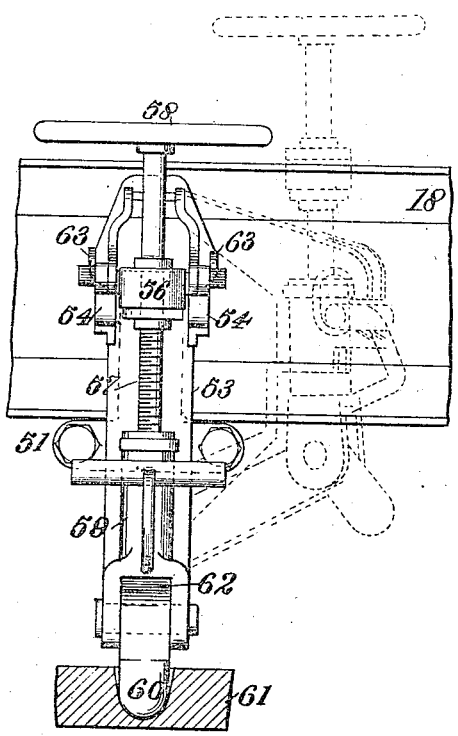
Fig. 11 shows a side elevation of one of the side outriggers in extended position.
Figure 12:
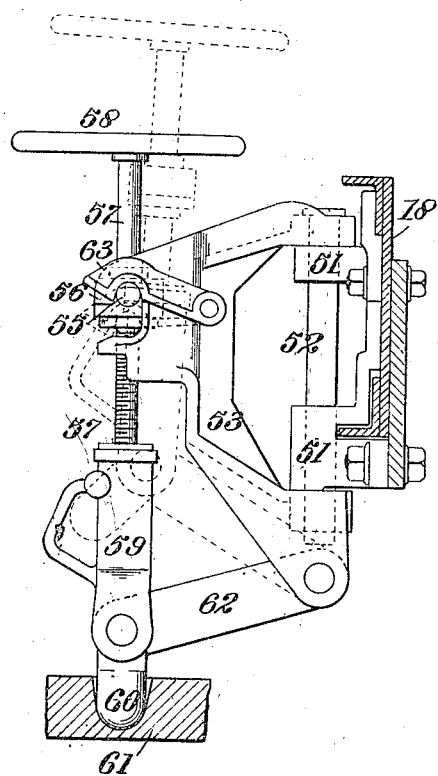
Fig. 12 shows a side elevation of the same, looking in a different direction.

Fig. 11 et seq. show one of the side outriggers. The results to be accomplished in this instance are the same as in the case of the corner outrigger. The full lines show the outrigger in position for supporting the main frame during the firing, while the dotted lines show it in position for traveling. This comprises a bearing 51 fixed to the side rail of the main frame and receiving, by means of a vertical pivot 52, a swinging bracket 53 which has, near its upper portion, bifurcations 54 to receive pins 55 on a collar 56 rotatable but not slidable on a screw-shaft 57. The said shaft has a hand-wheel 58 and enters a jack 59, at the lower end of which is a pivoted shank 60, carrying loosely a shoe 61 and having an angular extension 62 running up to and pivoted to the lower end of the swinging bracket. Hooks 63 hold the pins 55 in place on the bracket 53 for operating the jack. The latter is movable bodily upward independently of the bracket to clear the ground. The bracket may be swung to one side and the jack suspended on a hook when not in use, as shown in Figs. 11 and 13.

It will be seen from the plan view of Fig. 2 that when the gun is fired crosswise to one side or the other the shock of the recoil transmitted to the main frame will be received by the side outriggers lengthwise of the arms 62 and, therefore, will be properly opposed. However, in the case of the corner members positioned as they are, the shock might tend to tear off the pivots and, therefore, the universal connections previously described are necessary to overcome this. When the gun is fired fore or aft the arms 39 and the corner outriggers are properly disposed to receive the shocks, whereas the side outriggers can flex about the vertical pivots 52 to prevent breakage.

Various changes in the construction and arrangement of the several parts herein shown and described may be employed without departing from the spirit of our invention as disclosed in the appended claims.

Having thus described our invention, what we claim and desire to secure by Letters Patent is—

1. In a device of the character described, a main frame, an endless, flexible, self-laying track carriage at each side thereof, said main frame including a center casting resting upon the carriages at its sides with the tracks encircling integral side extensions thereof, side rails connected to said center casting and extending along the outside of the track carriages fore and aft thereof, and end pieces connecting the side rails across at their ends.

2. In a device of the character described, a main frame comprising a casting having a central portion for a gun mount and integral parallel fore and aft side extensions each adapted to be embraced by a self-laying track.

3. In a device of the character described, a main frame in the form of a one-piece casting having a central portion adapted for a gun mount with side fore and aft extensions formed integrally each adapted to be embraced by an endless self-laying track, and roller trucks on which said side extensions are yieldably supported when traveling on said self-laying tracks.

4. A self-propelled gun mount, comprising a pair of track laying trucks, a supporting platform for the gun formed of a single piece casting having its sides extended over the trucks and beneath the upper run of the tracks, and springs upon the trucks to support the platform.

5. A self-propelled gun mount, comprising a pair of track laying trucks, a supporting platform for the gun formed of a single piece casting having its sides extended over the trucks and beneath the upper run of the tracks, and idler rollers journaled on the platform to support the upper run of the track.

6. In a device of the character described, a main frame, a pair of track laying trucks to support the main frame, each truck being formed of a two part roller truck frame, the sections of which are entirely disconnected, and a pivotal connection between each roller truck frame section and the main frame.

7. In a device of the character described, a main frame, a pair of track laying trucks to support the main frame, each truck being formed of a two-part roller truck frame, the sections of which are entirely disconnected, a pivotal connection between each roller truck frame section and the main frame, and a spring on either side of the pivotal connection to resiliently support the main frame.

8. A self-propelled gun mount, comprising a platform to receive a turret gun, a track laying truck at each side of the platform to support the same, and outriggers for said platform engageable with the ground to oppose the thrusts of the platform when the gun is fired crosswise, and outriggers for said platform engageable with the ground to oppose the thrusts when the gun is fired fore or aft.

9. A self-propelled gun mount, comprising a platform to receive a turret gun, a track laying truck at each side of the platform to support the same, and outriggers for said platform engageable with the ground to oppose the thrusts of the platform when the gun is fired crosswise, outriggers for said platform engageable with the ground to oppose the thrusts when the gun is fired fore or aft, and connections for said outriggers permitting them to flex when the thrust is at an angle to their intended line of resistance.

In testimony whereof we have hereunto set our hands in the presence of two subscribing witnesses.

WILLIAM TURNBULL.
EMIL F. NORELIUS.

Witnesses:
H. BOSWELL,
ROBERT W. GOTSHALL.